Nov. 23, 1965 H. R. HYATT 3,219,010
SIGNAL FLAG
Filed June 5, 1963 3 Sheets-Sheet 1
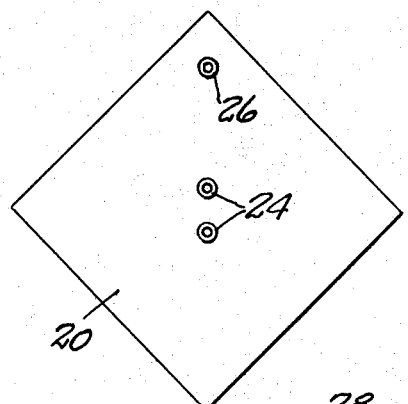
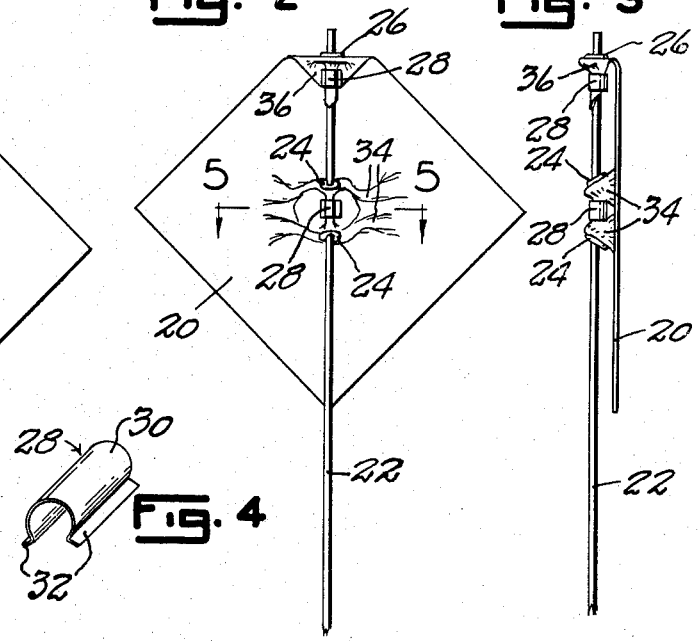
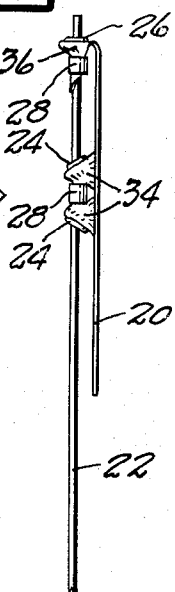
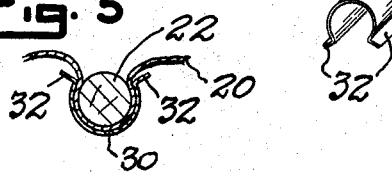
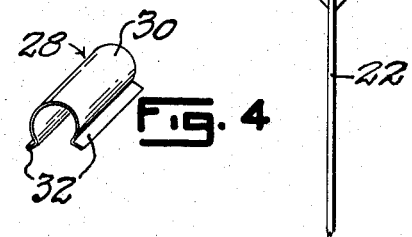
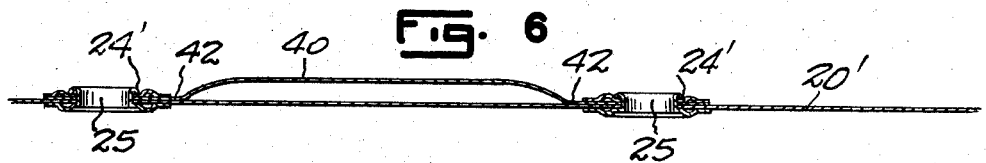
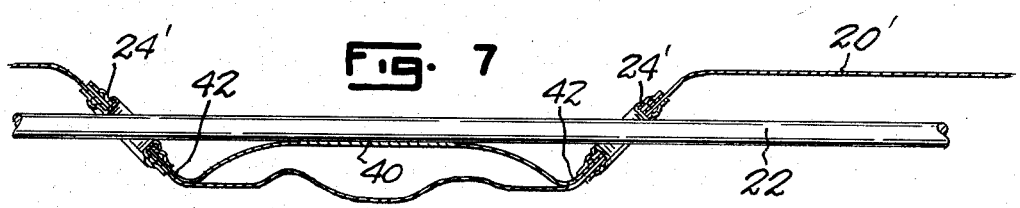
INVENTOR.
HAROLD R. HYATT
BY
Eugene C. Knoblock
ATTORNEY Nov. 23, 1965   H. R. HYATT   3,219,010
SIGNAL FLAG
Filed June 5, 1963   3 Sheets-Sheet 2
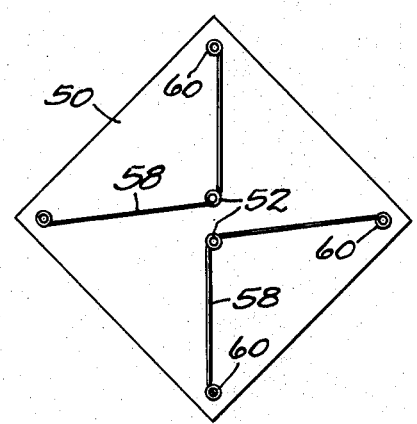
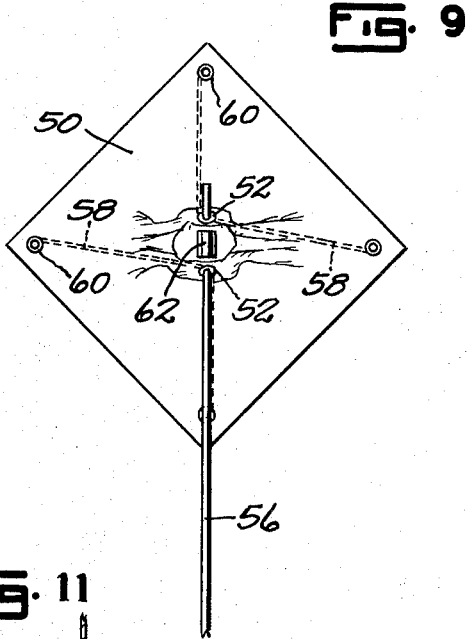
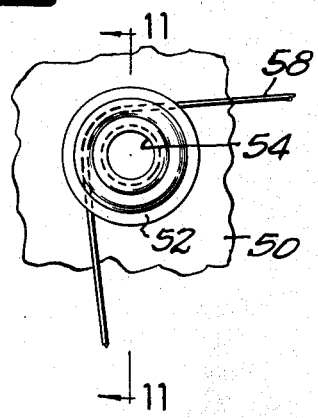
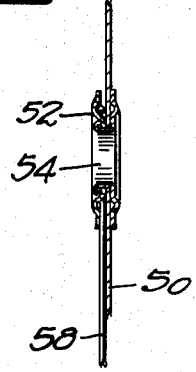
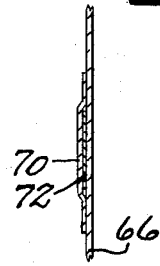
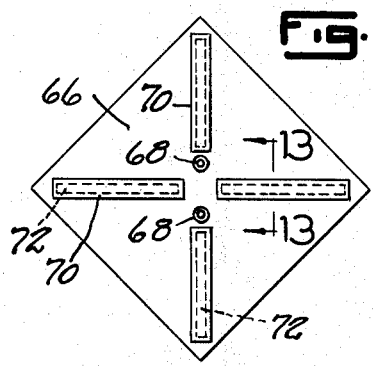
INVENTOR.
HAROLD R. HYATT
BY
Eugene C. Knoblock
ATTORNEY Nov. 23, 1965
H. R. HYATT
SIGNAL FLAG
3,219,010
Filed June 5, 1963
3 Sheets-Sheet 3
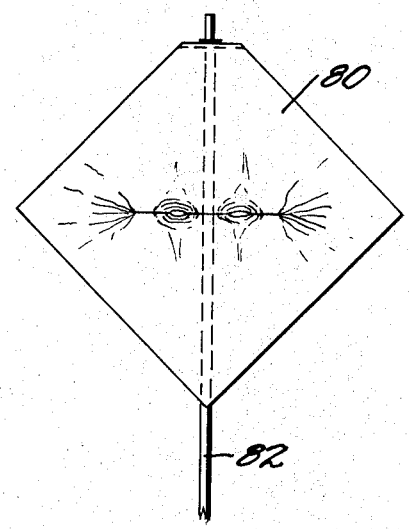
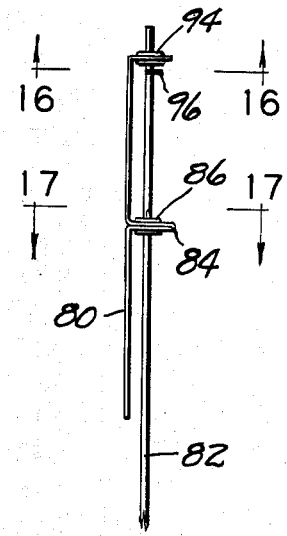
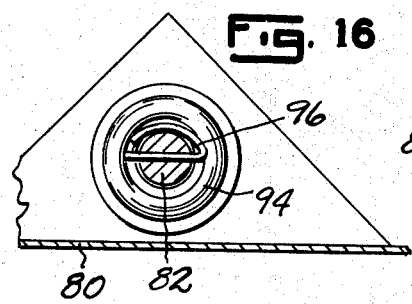
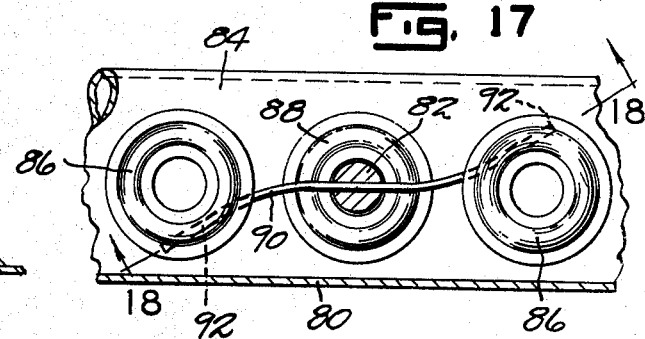
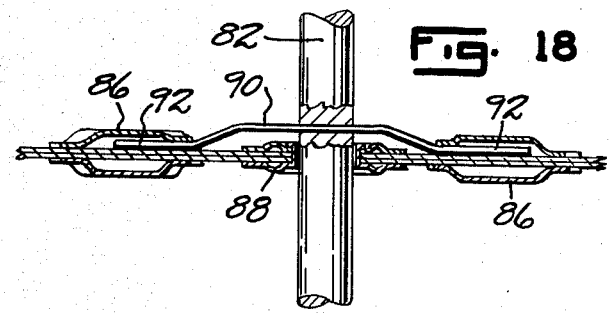
INVENTOR.
HAROLD R. HYATT
BY
*Eugene C. Knoblock*
ATTORNEY

United States Patent Office 3,219,010
Patented Nov. 23, 1965

3,219,010
SIGNAL FLAG
Harold R. Hyatt, Union Township, Fulton County, Ind.
(R.R. 3, Kewanna, Ind.)
Filed June 5, 1963, Ser. No. 285,800
5 Claims. (Cl. 116—173)

This invention relates to improvements in signal flags, and more particularly to signal flags of the character used upon slow-moving vehicles, upon the ends of projecting loads carried by moving vehicles, or upon stationary supports at repair points or dangerous points along roadways.

Signal flags are usually mounted upon a staff adjacent to one margin thereof. Such flags tend to whip in the wind and are subject to rapid wear caused by such wind whipping action. Another disadvantage of wind whipped flag action is that the flag may be extended in a direction producing minimum exposure to vision and thus rendering the flag of minimum use for its intended signalling purpose, or it may be whipped with such rapidity as to have little visible exposure.

It is the primary object of this invention to provide a novel, simple and inexpensive signal flag construction which overcomes the foregoing disadvantages.

Another object of the invention is to provide a flag with a novel center support which reduces the surface area thereof which is subject to whipping in the wind and thereby reduces fraying and tearing and increases the area of the flag visible to view and also reduces the wind pressure upon the staff which tends to break the staff.

A further object is to provide a flag having a novel means for mounting the same at the center thereof and anchoring the same upon a staff detachably and in a manner to hold the same extended and also to rigidify the same crosswise of the staff.

Other objects will be apparent from the following specification.

In the drawings,

FIGURE 1 is a plan view of the fabric or sheet portion of a flag constituting one embodiment of my invention;

FIGURE 2 is a view of an assembled flag and staff illustrating the manner in which the flag is mounted upon the staff as viewed in elevation;

FIGURE 3 is an edge view of the flag shown in FIGURE 2, as viewed from the right in FIGURE 2;

FIGURE 4 is a perspective view illustrating a clip used in assembling or connecting the flag upon the staff;

FIGURE 5 is a fragmentary detail sectional view taken on line 5—5 of FIGURE 2;

FIGURE 6 is an enlarged fragmentary sectional view of a portion of a flag constituting another embodiment of my invention;

FIGURE 7 is a sectional view illustrating the mounting of the flag shown in FIGURE 6 upon a staff;

FIGURE 8 is a face view of a flag sheet constituting another embodiment of my invention;

FIGURE 9 is a view of a flag mounted upon a staff;

FIGURE 10 is an enlarged detail elevational view of the embodiment illustrated in FIGURE 8;

FIGURE 11 is a sectional view taken on line 11—11 of FIGURE 10;

FIGURE 12 is a face view of a flag sheet constituting another embodiment of my invention;

FIGURE 13 is a transverse sectional view taken on line 13—13 of FIGURE 12;

FIGURE 14 is a view of an assembled flag constituting another embodiment of my invention, as seen in face elevation;

FIGURE 15 is an edge view of the embodiment of the invention illustrated in FIGURE 14, as viewed from the right in FIGURE 14;

FIGURE 16 is an enlarged detail sectional view taken on line 16—16 of FIGURE 15;

FIGURE 17 is an enlarged detailed sectional view taken on line 17—17 of FIGURE 15;

FIGURE 18 is an enlarged sectional view taken on line 18—18 of FIGURE 17.

Referring to the drawings, and particularly to FIGURES 1 to 5 thereof which illustrate on embodiment of the invention, the numeral 20 designates a flag which is to be mounted upon a flag staff 22. The flag 20 may be formed of any desired flexible sheet material, such as fabric, flexible plastic sheet material, plastic impregnated fabric or the like. The flag 20 may be of any suitable dimension, such as a size of 12x12, 10x10, or 15x15. The flag will preferably be of generally square or rectangular shape but it may be of circular, oval, oblong or other desired configuration. Adjacent its center the flag is perforated at spaced points and a grommet 24 is mounted thereon at each of these points. The two points are preferably substantially equally spaced from the center of the flag and have a central opening therethrough of a diameter slightly larger than the cross-sectional size of the staff 22 so that the staff may pass freely therethrough. I also prefer to provide the flag with a third grommet 26 located adjacent the margin thereof and preferably substantially aligned with the two grommets 24 and spaced a substantial distance therefrom. The grommet 26 is located at an opening in the flag and has a passage therethrough of a size to accommodate and receive the staff 22.

The flag 20 is mounted upon the staff 22 in the manner illustrated in FIGURES 2, 3 and 5. Thus the staff is passed through the aligned grommets 24, 26. Spring clips 28, as illustrated in FIGURE 4, are preferably formed of metal and have a central circular part 30 of a diameter slightly greater than the diameter of the staff 22. The central portion 30 preferably extends approximately 135 degrees and outwardly projecting flanges 32 project from the margins. The spring clip 28 is applied to the staff and to the banner or flag 20 in the manner illustrated in FIGURE 5, with the central curved portion thereof firmly clamping the flag 20 to the staff 22. One of the clips 28 is preferably located between the two grommets 24, as seen in FIGURES 2 and 3, in such a manner and location as to provide transversely extending folds 34 in the flag extending transversely of the staff 22. The upper portion of the staff passes through the upper grommet 26, and the portion of the flag between the grommet 26 and its edge is folded downwardly at 36 and is retained by another metal clamp 28.

The flag is thus mounted at three points thereof and is anchored to the staff at its center and at its upper margin. The lower margin of the flag is permitted to drape naturally. The transverse folds 34 of the flag tend to cause it to extend laterally substantially full width. Thus under all normal conditions the major portion of the area of the flag is exposed so that it may satisfactorily serve its warning purposes when properly colored, for example, when colored a brilliant red or orange. When mounted upon a vehicle the flag is preferably oriented with the staff foremost and the flag rearmost. Thus the flag would be mounted as seen in FIG. 3 where a vehicle is to travel from right to left, as viewed in FIG. 3. In this way the flag floats freely unrestrained by the staff and may assume a teardrop or natural drape incident to wind action as the vehicle travels. This maintains maximum visibility and exposure of the flag from side to side thereof and reduces whipping of the flag in the wind. It will be observed that the transverse folds 34 of the sheet tend to hold it extended to present maximum area for exposure and visibility. The clip mounting of the flag facilitates ready assembly and disassembly thereof, thereby reducing cost of manufacture, facilitating compact shipment and accommodating substitution of flags or staffs if desired.

A slight modification of the construction shown in FIG. 1 designed to eliminate the need for use of the centrally positioned metal clip is illustrated in FIGS. 6 and 7, wherein the flag 20' has a pair of spaced centrally positioned grommets 24' with central openings 25 therethrough which are of a diameter larger than the diameter or cross-sectional size of the staff 22. An elongated leaf spring member 40 is centrally bowed so as to provide end portions 42 thereof which are anchored to the grommets 24' and lie in a common plane offset from the central portion of the spring 40 to a slight distance comparable to the thickness of the staff. In assembling the flag of this embodiment of the invention upon the staff 22, the staff 22 is passed through grommets 24' so that a portion thereof bears against the leaf spring 40, as illustrated in FIG. 7. This positions the gromemts 24' at an angle to the staff and to each other with the spring acting to urge the grommets 24' toward their normal coplanar relation, as seen in FIG. 6. Thus a firm clamping action is exerted upon the staff which firmly anchors the flag at selected position upon the staff without requiring the application of additional connector means as illustrated in the FIG. 1 embodiment. It will be understood, of course, that clamp means 28 may be utilized in the flag of the FIG. 6 embodiment adjacent the uppermost margin thereof, as illustrated at the top of FIG. 2, if desired.

Another embodiment of the invention is illustrated in FIGS. 8 to 11, inclusive, wherein a flag sheet 50 of any suitable size and configuration has mounted thereon and secured thereto adjacent to its center and preferably substantially equally spaced from its center a pair of grommets 52, each having a central passage 54 of a size to slidably receive a flag staff 56. Grommets 52, like grommets 24' of the FIG. 6 embodiment, are formed in two parts which mechanically interlock adjacent and around the central opening 54 thereof and whose marginal portions encircle and clamp the flag 50 around the margin of a central opening therein. In this embodiment of the invention a pair of substantially V-shaped wire springs 58 are anchored at their centers by the grommets 52 by passing between the two halves of the grommet, as illustrated in FIG. 11. The free ends of the springs 58 are anchored to the flag 50 at spaced points thereof adjacent the margin of the flag by means of fasteners 60. The fasteners 60 are preferably located substantially equispaced from each other around the margin of the flag, as seen in FIG. 8.

The flag of the FIG. 8 embodiment is mounted upon the staff 56 in the manner illustrated in FIG. 9 by passing the staff 56 through the openings in the central grommets 52 and thereupon utilizing a spring clip 62 which may be of the construction illustrated in FIG. 4 around the portion of the flag between the grommets 52 to anchor the flag upon the staff. It will be noted that one arm of each of the springs may extend substantially parallel to the staff 56, and another arm of each of the springs 58 may extend substantially perpendicularly to the staff 56. Thus it is possible by the use of the springs 58 to hold the flag 50 distended so that it presents maximum exposure or visibility for signalling purposes. At the same time the flag can flex as required to mount it upon the staff, as seen in FIG. 9, and also may flex to accommodate wind action thereagainst or striking of an obstacle. In this embodiment of the invention the advantages of quick and easy mounting or assembly, of minimizing of wind whipping and tearing or fraying, which are mentioned above, are retained.

Another embodiment of the invention illustrating a variation of the embodiment illustrated in FIGS. 8 to 11 is shown in FIGS. 12 and 13. In this form of the invention the flag sheet 66 of the same size, shape and character previously described, has a pair of spaced grommets 68 secured thereto and passing therethrough adjacent the center thereof and preferably equally spaced from the center. A plurality of pockets radiate from the center of the flag at 70, being provided by stitching or marginally adhering to the flag 66 elongated pocket-forming strips of fabric or synthetic resin sheet material 70. Each of the pockets 70 encloses and retains an elongated stiffener 72 which preferably is a thin strip of resilient material, such as spring metal or wood strips or plastic strips. The arrangement of the pockets is preferably such that two thereof will extend substantially transversely of the line between the two grommets 68, so as to extend substantially transversely relative to a staff upon which the flag is mounted in a manner similar to that shown in FIG. 9 by passing the staff through the grommets 68 and then clamping or anchoring the flag to the staff by a spring clip or other means. At least one pocket 70 may extend substantially in alignment with the two grommets 68 to extend thereabove as the flag is mounted.

In the embodiment of the invention illustrated in FIGS. 14 to 18, inclusive, flag 80 of substantially the character previously described is permanently mounted upon a staff 82. At its center the flag has a fold 84 located to extend crosswise of the staff 82 and retained by a pair of fasteners 86 and a central grommet 88. The parts 86 and 88 are preferably aligned and the central grommet 88 has an opening therethrough adapted to slidably receive the staff 82. The staff 82 has an opening therethrough within which is mounted elongated wire 90. The opposite end portions 92 of the wire are anchored by the fasteners 86. The uppermost marginal portion of the flag 80 has a grommet 94 provided with an opening through which the staff 82 may pass. The staff 82 has a transverse opening adjacent its upper end through which passes a wire retainer 96 adapted to underlie and support the grommet 94.

In the FIG. 14 embodiment of the invention, a firm positive and permanent anchorage of the upper part of the flag with the staff is provided by a support of the upper grommet 94 upon the retainer 96. Likewise, a firm central support between the staff and the flag is provided by the cross-member or wire 90 carried by the staff and anchored to the laterally spaced fasteners 86. This arrangement provides a central transverse fold of the flag which will rigidify the same at the central part only thereof, but the fold extends to the margin of the flag and thus normally the flag is extended laterally forwardly thereof.

It will be observed that all embodiments of the invention are characterized by central mounting of a flag upon a staff in such a manner that the spacing of all marginal portions from the anchorage points is substantially less than the transverse width of he flag itself. This reduces the spacing between unsupported edges of the flag and the staff, and hence shortens the parts which are subject to flapping in the wind. Consequently, tearing or fraying of the marginal portions of the flag is minimized. At the same time, in each embodiment means are provided which tend to hold the flag extended laterally. This means may be directional folding of the flag itself with the folds extending transversely of the staff, as in the form shown in FIGS. 1 and 14, or it may constitute additional and separate reinforcing means, as shown in the forms illustrated in FIGS. 8 and 12. In all instances, the construction is characterized by light weight, low cost, high visibility, and long life.

While the preferred embodiments of the invention have been illustrated and described, it will be understood that changes in the construction may be made within the scope of the appended claims without departing from the spirit of the invention.

I claim:

1. A signal flag comprising a flag-forming sheet of flexible material having a medial portion thereof folded transversely upon itself and extending laterally therefrom, laterally spaced anchoring means formed in said medial folded portion and including a grommet adjacent the center of said medial folded portion and having an opening therein, an elongated substantially straight staff extending through and slidable in said grommet opening, means adjacent said grommet for releasably anchoring said sheet to said staff, and means for positioning the portion of said sheet above said medial folded portion alongside the portion of said staff above said grommet.

2. A signal flag as defined in claim 1, and
means for positioning the medial folded portion of said sheet to extend laterally from said staff.

3. A signal flag as defined in claim 1, and
a connector extending between said laterally spaced anchoring means and secured to said staff.

4. A signal flag as defined in claim 1 wherein said last named means constitutes
an apertured grommet carried by the portion of said sheet spaced above said medial sheet portion to receive said staff, and
a stop secured to said staff below and supporting said last named grommet.

5. A signal flag comprising a flag-forming sheet of flexible material, said sheet being folded laterally substantially centrally thereof, grommet means in said fold, said grommet means constituting a plurality of fold anchors, a staff extending through at least one of said grommet means, means adjacent said grommet means for releasably securing said central sheet portion to said staff, and means for positioning the portion of the sheet above said central folded sheet portion alongside the portion of said staff above said grommet means.

References Cited by the Examiner

UNITED STATES PATENTS

| | | | |
|---|---|---|---|
| 1,195,224 | 8/1916 | Hoffman | 116—174 |
| 2,022,160 | 11/1935 | Sorensen | 40—10 |
| 2,059,996 | 11/1936 | Goldberg | 40—125 |
| 2,147,562 | 2/1939 | Thomas | 40—125 |
| 2,192,514 | 3/1940 | Carleton | 40—10 |
| 2,459,928 | 1/1949 | Edwards | 40—125 |
| 2,461,054 | 2/1949 | Green | 40—10 |
| 2,527,357 | 10/1950 | Donahey | 116—174 |
| 2,613,464 | 10/1952 | Lisle | 40—125 |
| 2,855,890 | 10/1958 | Sprenger et al. | 116—173 |
| 3,091,215 | 5/1963 | Kenmore | 116—63 |

LOUIS J. CAPOZI, *Primary Examiner.*